(12) United States Patent
Legler

(10) Patent No.: US 11,714,795 B2
(45) Date of Patent: Aug. 1, 2023

(54) PARTIAL COMPRESSION OF TREE-BASED INDEX STRUCTURE

(71) Applicant: SAP SE, Walldorf (DE)

(72) Inventor: Thomas Legler, Walldorf (DE)

(73) Assignee: SAP SE, Walldorf (DE)

( * ) Notice: Subject to any disclaimer, the term of this patent is extended or adjusted under 35 U.S.C. 154(b) by 15 days.

(21) Appl. No.: 17/483,287

(22) Filed: Sep. 23, 2021

(65) Prior Publication Data

US 2023/0086449 A1  Mar. 23, 2023

(51) Int. Cl.
*G06F 16/22* (2019.01)
*G06F 12/02* (2006.01)

(52) U.S. Cl.
CPC ...... *G06F 16/2246* (2019.01); *G06F 12/0238* (2013.01); *G06F 16/2282* (2019.01)

(58) Field of Classification Search
CPC .. G06F 3/067; G06F 16/2246; G06F 16/9027; G06F 3/0631; G06F 2212/7207
USPC ......................................................... 707/608
See application file for complete search history.

(56) References Cited

U.S. PATENT DOCUMENTS 5,414,839 A  *  5/1995  Joshi ........................ G06F 9/526
710/200
2017/0316041 A1 *  11/2017  Delaney .............. G06F 16/2237

FOREIGN PATENT DOCUMENTS

EP  3376407 A1  9/2018

OTHER PUBLICATIONS

Pollari-Malmi, Kerttu B+-trees, [undated], downloaded date Aug. 28, 2021, 9pgs.
(Continued)

*Primary Examiner* — Hung T Vy
(74) *Attorney, Agent, or Firm* — Buckley, Maschoff & Talwalkar LLC

(57) ABSTRACT

A system includes storage of data into a target memory location allocated to a target leaf node of a tree-based index structure, the target leaf node being a child node of a parent node of the tree-based index structure, where the tree-based index structure comprises one or more other leaf nodes which are child nodes of the parent node, and each of the target leaf node and the one or more other leaf nodes is associated with a plurality of allocated memory locations, incremental identification of all unused allocated memory locations between a first allocated memory location of a left-most one of the target leaf node and the one or more other leaf nodes and a last used allocated memory location of a right-most one of the target leaf node and the one or more other leaf nodes, and movement of data stored in the target leaf node and the one or more other leaf nodes into the identified unused allocated memory locations.

18 Claims, 8 Drawing Sheets

(56) References Cited

OTHER PUBLICATIONS

Raatikka, Vilho "Cache-Conscious Index Structures for Main-Memory Databases", Helsinki, Department of Computer Science, Feb. 4, 2004, 88pgs.
Rao, Jun et al., "Making B+-Trees Cache Conscious in Main Memory", MOD, 2000, (pp. 475-486, 12 total pages).
"Communication: The Extended European Search Report", European Patent Office, dated Jan. 24, 2023 (dated Jan. 24, 2023),for European Application No. 22196117.0-1203, 12pgs.
Boehm, Matthias et al., "Efficient In-Memory Indexing with Generalized Prefix Trees", Dec. 31, 2011 (Dec. 31, 2011), XP055397751, Retrieved from the Internet: URL:http://subs.emis.de/LNI/Proceedings/Proceedins180/227.pdf, [retrieved on Aug. 10, 2017], (pp. 227-246, 20pgs.).

\* cited by examiner

PARTIAL COMPRESSION OF TREE-BASED INDEX STRUCTURE

BACKGROUND

A conventional database system manages large amounts of data in the form of database tables. The database system is required to persist, read and update this managed data. Designing a system to meet each of these requirements involves many performance and cost trade-offs.

For example, data may be stored in a highly-compressed format to reduce the amount of memory required by a system. However, this compression hinders the system's ability to quickly update the data in response to a received DML (Data Manipulation Language) statement. On the other hand, system update performance may be improved by using a tree-based index structure, but strong compression of a tree-based index structure would undercut the performance advantages provided by the structure. Accordingly, a tree-based index structure typically consumes appreciably more space than a highly-compressed version of the same data.

In some situations, less memory consumption may enable faster performance. Specifically, processing performance increases as data is stored "closer" to the Central Processing Unit (CPU). Data stored in an L1 cache may be processed 10× faster than data stored in an L2 cache and 100× faster than data stored in main memory (e.g., Dynamic Random Access Memory (DRAM)). The size of an L1 cache is typically much smaller than an L2 cache which in turn is much smaller than main memory. Accordingly, it is desirable to reduce the size of stored data in order to increase the proportion of the data which can be stored in higher-performance memory regions.

Cost and performance considerations are particularly acute in a cloud-based environment. In order to maximize utilization of available hardware, a cloud-based deployment may execute several database system instances within respective virtual machines of a single computer server. Each database system instance shares the volatile memory and processing power of the single computer server. Moreover, the shared volatile memory is expensive in comparison to on-premise deployments.

Contrary to conventional systems, some prior systems operate to occasionally rewrite a tree-based index structure without including the unused memory areas which are typically present in a tree-based index structure. These systems conserve memory but reduce insert performance because new memory areas must be allocated to receive inserted data. Moreover, access to the entire tree-based index structure (and therefore to all the data it represents) is blocked during the rewriting.

Consequently, systems are desired to decrease the amount of memory used by a tree-based index structure while providing satisfactory update performance.

DETAILED DESCRIPTION

The following description is provided to enable any person in the art to make and use the described embodiments. Various modifications, however, will remain readily-apparent to those in the art.

Tree-based index structures are typically designed to optimize update performance at the expense of memory consumption. For example, some tree-based index structures utilize the presence of unused, pre-allocated memory to support fast inserts of new values without the need to move existing data.

Embodiments identify portions of a tree-based index structure for compression and efficiently compress the identified portions. Such compression reduces the amount of memory consumed by the tree-based index structure while allowing read and write access to other portions of the tree-based index structure. The compression occurs at the leaf node level. Due to the high fanout of a typical tree-based index structure, compression at the leaf node level may serve to significantly reduce the amount of memory required to store the tree-based index structure.

In some embodiments, compression of a portion of a tree is triggered by an insert operation. For example, in response to insertion of a value into a leaf node, embodiments may operate to merge the values stored in the leaf node and all sibling leaf nodes into a smallest number of required leaf nodes. According to some embodiments, insertion of a value into a leaf node triggers evaluation of one or more compression criteria, and merging of sibling nodes is initiated only if the compression criteria are satisfied.

Such merging may, as described below, require updating of a key stored within the parent node of the sibling leaf nodes. The merging may result in one or more empty leaf nodes, and the memory allocated to the now-empty leaf node(s) may be de-allocated. Some embodiments perform compression as an incremental job piggybacked on regular DML operations. This job may have a low impact on DML workloads and does not require global, long-running, expensive maintenance operations.

Figure 1:
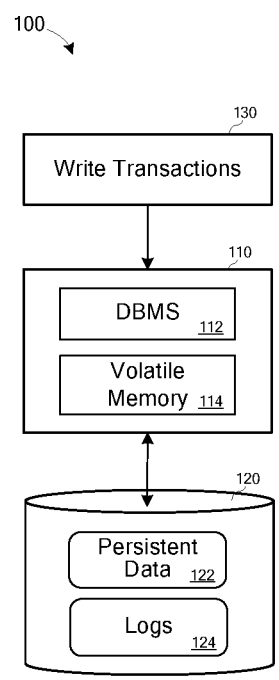
FIG. 1 is a block diagram of a database architecture according to some embodiments.

FIG. 1 is a block diagram of system 100 according to some embodiments. The illustrated elements of system 100 may be implemented using any suitable combination of computing hardware and/or software that is or becomes known. Such combinations may include one or more programmable processors (microprocessors, central processing units, microprocessor cores, execution threads), one or more non-transitory storage media, and processor-executable program code. In some embodiments, two or more elements of system 100 are implemented by a single computing device. One or more elements of system 100 may be implemented by an on-premise system and/or using cloud-based resources.

System 100 includes database server 110 and persistent storage 120. Database server 110 may comprise server hardware such as but not limited to an on-premise computer server. Database management system (DBMS) 112 may comprise program code of any query-responsive DBMS that is or becomes known, including but not limited to a structured-query language (SQL) relational DBMS. Volatile memory 114 may include a cache for storing recently-used data as is known in the art. In some embodiments, database server 110 provides an "in-memory" database, in which volatile memory 114 stores a cache as well as the full database during operation.

More specifically, for each database table of a database, volatile memory 114 may store a main structure and a delta structure. The main structure for a given table may comprise one or more separate main structures for each column of the table, and the delta structure may similarly comprise a one or more separate delta structures for each column of the table. A main structure is highly-compressed and read-optimized, while a delta structure is used for updates, i.e., DML workloads are processed using the delta structure. Each delta structure is merged into its corresponding main structure from time to time based on various triggers in order to update the main structure to reflect a most-recent version of the database table/column.

Persistent storage 120 includes persistent data 122. Persistent data 122 may comprise database tables of a database, as well as database snapshots and other backup-related files. Upon startup, in the case of an in-memory database, the database tables of persistent data 122 are loaded into volatile memory 114. Logs 124 comprise records of database transactions and allow auditing and transaction roll-back in case of a database crash as is known in the art.

The database tables may be stored in persistent data 122 and/or volatile memory 114 in a column-based and/or row-based format. In a column-based format, the data of each column of a database table is stored in contiguous memory addresses as is known in the art. In a row-based format, the data of each row is stored in contiguous memory addresses. Column-based storage may exhibit greater compressibility than row-based storage due to contiguous runs of similar data.

During operation of system 100, write transactions 130 received from applications (not shown) issue commands such as but not limited to DML statements which require changes to the stored database tables. In some embodiments, such changes are applied to delta structures which are stored in volatile memory 114 and/or persistent data 122 as tree-based index structures. Tree-based storage and compression as described herein is not limited to delta structures and may be implemented to store any set of <key, value> pairs.

Although system 100 reflects a "single node" database system, embodiments may also be implemented within one or more nodes of a distributed database, each of which comprises an executing process, a cache and a datastore. The data stored in the datastores of each node, taken together, represent the full database, and the database server processes of each node operate to transparently provide the data of the full database to the aforementioned applications. System 100 may also or alternatively support multi-tenancy by providing multiple logical database systems which are programmatically isolated from one another.

Figure 2:
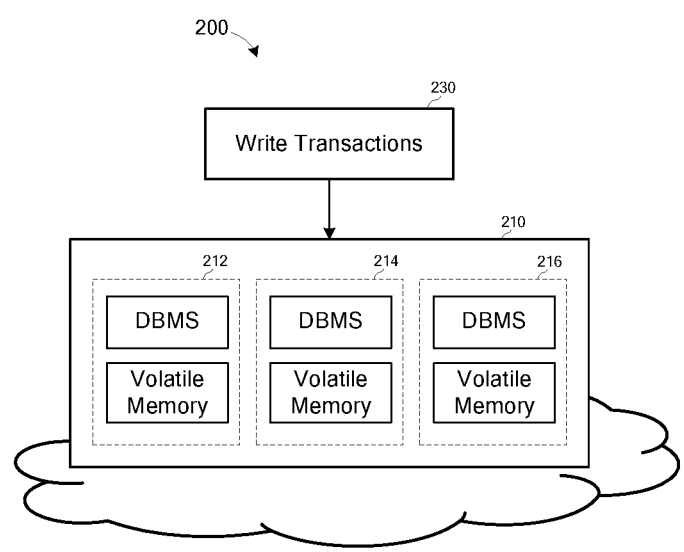
FIG. 2 is a block diagram of a cloud-based database architecture according to some embodiments.

FIG. 2 depicts a cloud-based database implementation according to some embodiments. Cloud-based server 210 may comprise a blade server located in a cloud datacenter. Consistent with the principles of cloud-based resource provisioning, server 210 may execute a hypervisor to apportion the hardware resources of server 210 (e.g., volatile memory) among virtual machines 212, 214 and 216. Each of virtual machines 212, 214, and 216 executes its own operating system and a corresponding DBMS in order to provide a database system instance. Each database system instance may communicate with cloud-based persistent storage (not shown) to store persistent data and logs as needed.

Write transactions 230 may be received and routed to an appropriate database system instance of virtual machines 212, 214 and 216. The database system instance may update one or more corresponding tree-based index structures as described herein according to the received write transactions 230. The tree-based index structures may be stored in volatile memory of the virtual machine, in persistent storage, or partially in volatile memory and partially in persistent storage.

Figures 3, 4:
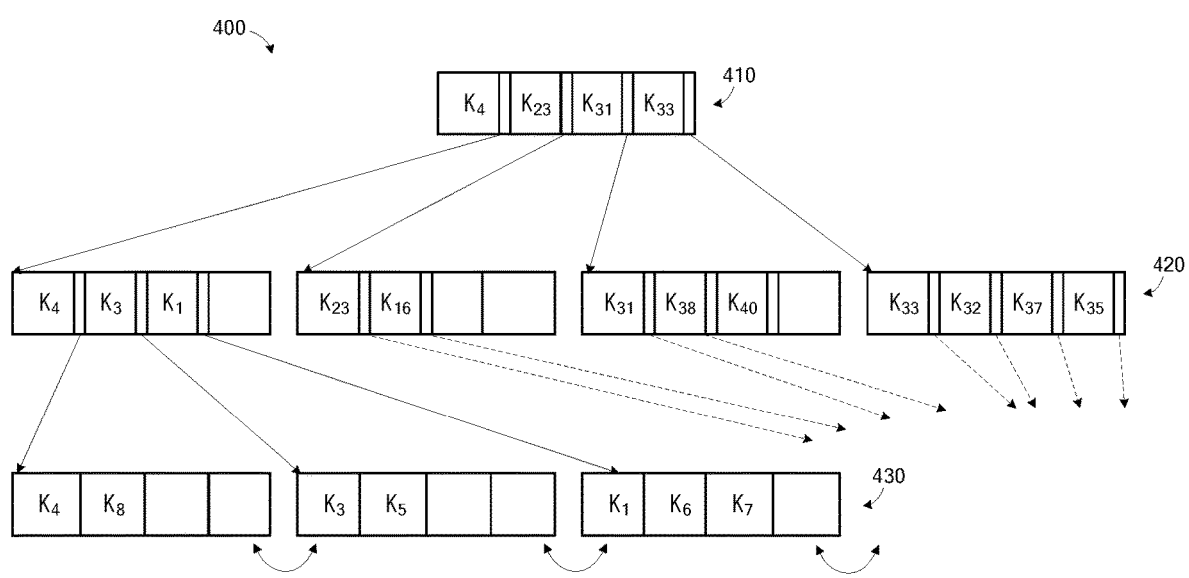
FIG. 3 is a tabular representation of a plurality of <key, value> pairs according to some embodiments.
FIG. 4 is a graphical representation of a tree-based index structure according to some embodiments.

FIG. 3 is a tabular representation of a portion of data which may be stored in a tree-based index structure according to some embodiments. Data 300 comprises a plurality of <key, value> pairs. Data 300, for example, may comprise a portion of a database column, in which each value represents a column value. Data 300 may comprise a data dictionary for dictionary-compression as is known in the art. In some embodiments, a value of data 300 comprises a pointer to a memory location which stores a data value corresponding to the corresponding key.

Embodiments may be applicable to any type of tree-based index structure in which leaf nodes may include unused allocated memory locations. Examples of such structures include but are not limited to B-trees, B+-trees, and CSB+-trees.

FIG. 4 depicts B+-tree 400. As is known in the art, root node 410 and each internal node 420 of B+ tree 400 stores key values (up to four in the present example) and corresponding pointers to lower-level nodes. Each leaf node 430 stores <key, value> pairs in which the value may comprise one or more data values, pointers to stored data values, tuples, identifiers, or other suitable data. Advantageously, leaf nodes 430 include pointers to adjacent leaf nodes to form a linked list which provides ordered access to the stored values.

Figure 5:
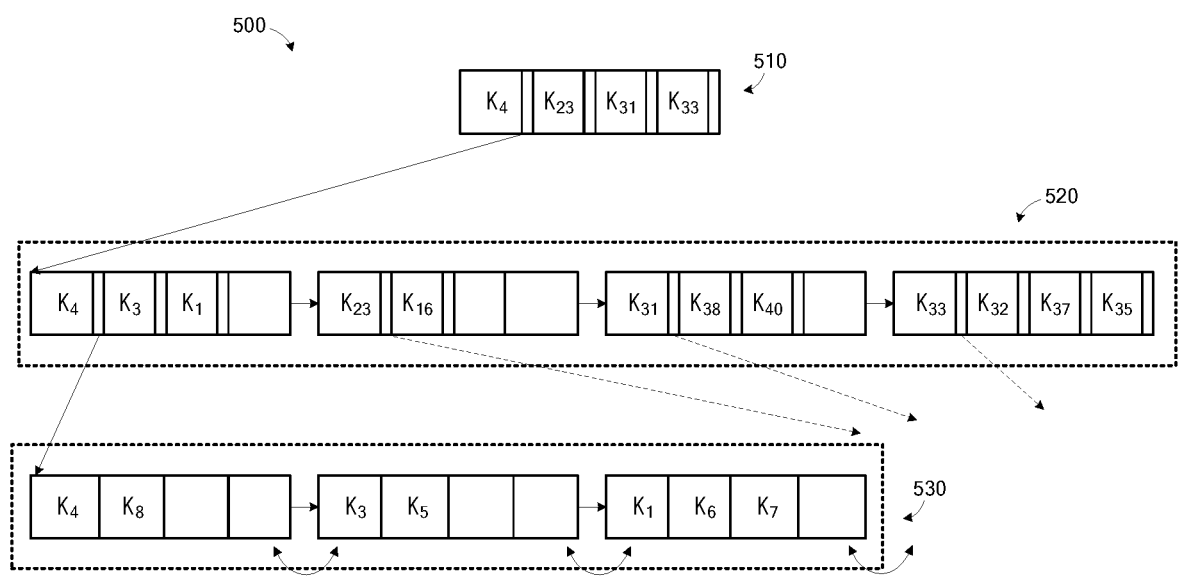
FIG. 5 is a graphical representation of a tree-based index structure according to some embodiments.

In another example of a tree-based index structure, FIG. 5 depicts CSB+-tree 500. Unlike a B+-tree, all child nodes of a given parent node (i.e., sibling nodes) are considered a "node group" and stored contiguously. Node groups are designated by the dashed lines in FIG. 5. Due to the contiguous storage, any node in a node group can be located based on an offset from the first node in the node group.

Each of internal nodes 510 and 520 therefore includes a pointer to its first child node (and no other pointers), the number of keys in the node, and a list of the keys. Since a node of CSB+-tree 500 stores only one child pointer, the node can store more keys per node than a B+-tree. For example, given a 64 byte node size (and cache line size on Intel CPU architectures) and 4 byte keys and child pointers, a B+-tree node can hold 7 keys while a CSB+-tree node can hold 14 keys. Each leaf node 530 stores a list of <key, value> pairs, the number of stored pairs, and pointers to its sibling nodes.

Figure 6:
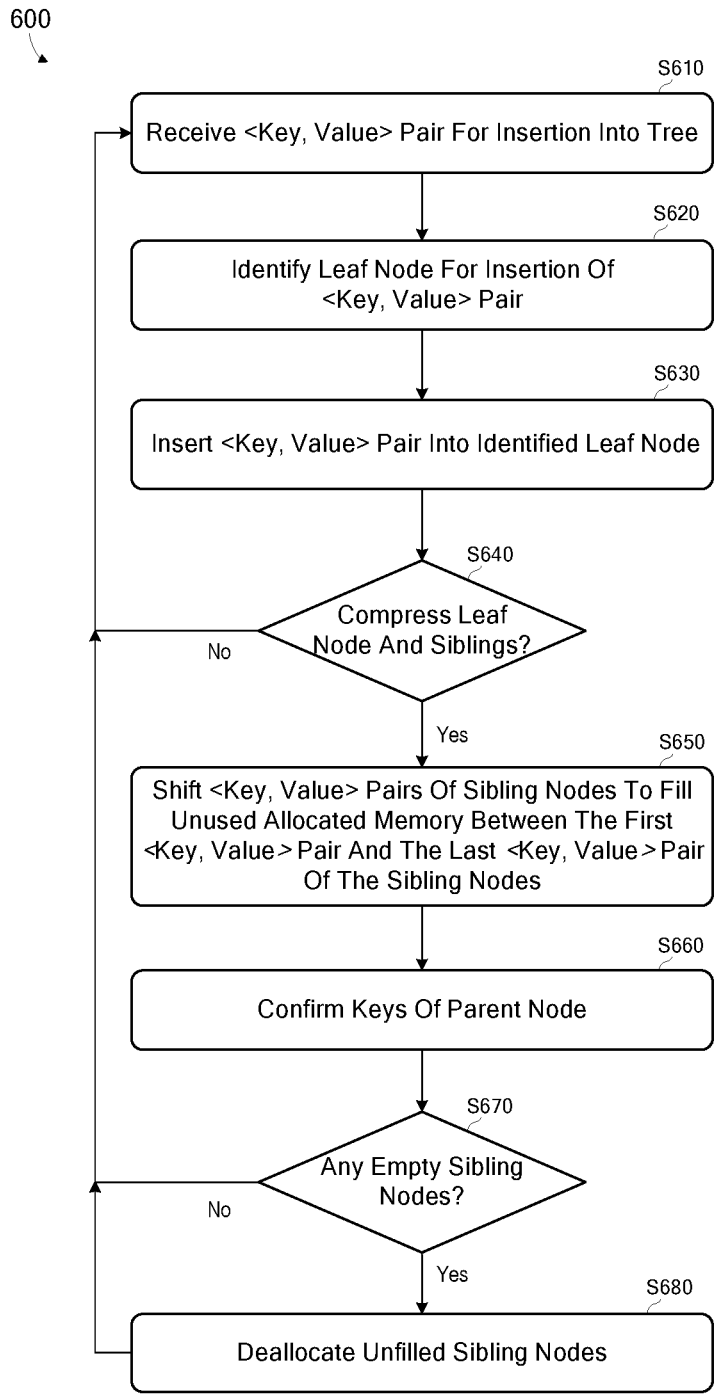
FIG. 6 comprises a flow diagram of a process to partially-compress a tree-based index structure according to some embodiments.

FIG. 6 comprises a flow diagram of process 600 to process an insert operation using a tree-based index structure according to some embodiments. In some embodiments, various hardware elements execute program code of a DBMS to perform process 200. Process 200 and other processes described herein may be executed by a database system using any suitable combination of hardware and software. Program code embodying these processes may be stored by any non-transitory tangible medium, including a fixed disk, a volatile or non-volatile random-access memory, a DVD, a Flash drive, and a magnetic tape, and executed by any suitable processing unit, including but not limited to one or more programmable microprocessors, microcontrollers, processing cores, and processor threads. Embodiments are not limited to the examples described below.

Initially, at S610, a <key, value> pair is received for insertion into a particular tree-based index structure. The pair may be received by a storage engine, page manager or other component which manages the storage and retrieval of data. In one example, the <key, value> pair is a value of a cell of a database table which is stored in columnar format. Accordingly, the <key, value> pair is to be stored in the tree-based index structure associated with the column of the cell. Embodiments are not limited thereto. For example, as described above, the value of the <key, value> pair may comprise a pointer to a memory location at which the cell value is stored.

Next, at S620, a leaf node into which the <key, value> pair is to be inserted is identified. The identified leaf node may be referred to as a target leaf node. The identification at S620 is dependent on the type of the tree-based index structure. Generally, for example, identification of the correct leaf node includes execution of the particular search algorithm of the tree-based index structure to search for the key of the <key, value> pair, which identifies the node into which the key should be stored.

Figure 7:
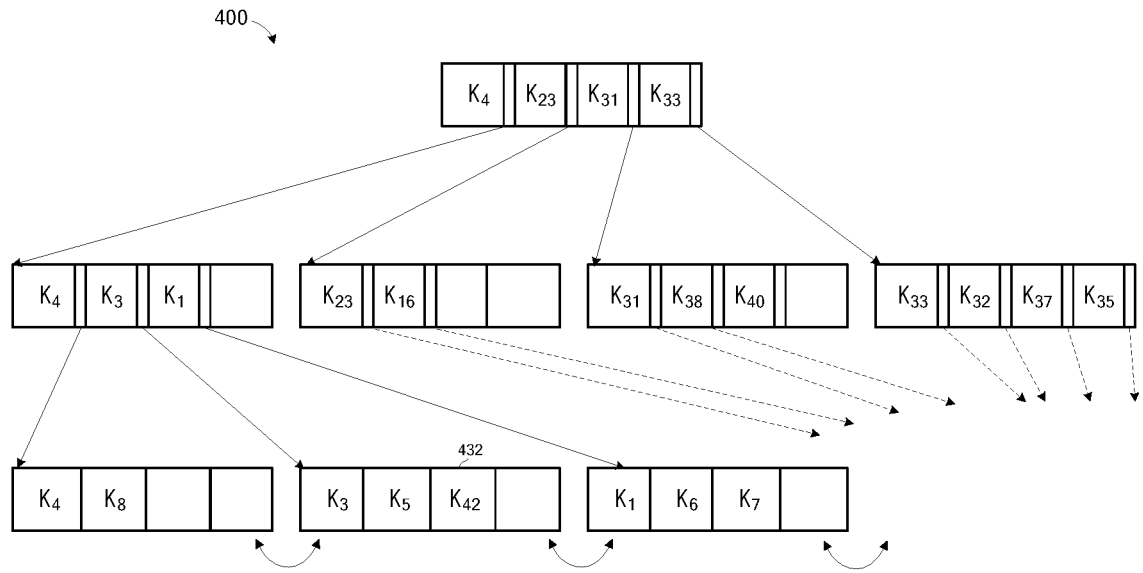
FIG. 7 is a graphical representation illustrating insertion of data into a tree-based index structure according to some embodiments.

The <key, value> pair is inserted into the identified leaf node at S630. FIG. 7 illustrates an example in which key $K_{42}$ (and its paired value, not shown) has been inserted at leaf node 432 of tree-based index structure 400 at S630. In some embodiments, the identified node might not include any unused allocated memory. In such a case, the node may be split as is known in the art to generate two nodes having unused allocated memory, and the <key, value> pair may be inserted into an appropriate one of the two nodes. The splitting and insertion process is dependent upon the type of the tree-based index structure and is not discussed in detail herein for the sake of brevity.

At S640, it is determined whether the leaf node into which the pair was inserted and its sibling nodes should be compressed as described herein. In some embodiments, compression occurs in response to every insertion. Some embodiments may utilize a counter to cause compression to occur after every M insertions. The determination at S640 may be based on random chance such as a software-executed "coin-flip" with a 50% chance of either outcome, or an otherwise-weighted chance (e.g., 75%/25%) of either outcome.

In some embodiments, the determination at S640 may be also or alternatively based on characteristics of the tree-based index structure. For example, it may be determined to perform the compression if the fill rate of the leaf nodes exceeds a threshold, or if the memory consumption of the tree-based index structure exceeds a threshold. In yet another embodiment, the determination may be based on the projected outcome of the compression. In some examples, it is determined at S640 to perform the compression if compression will eliminate at least one leaf node, or a certain percentage of all leaf nodes.

If it is determined at S640 to not compress the leaf node and its siblings, flow returns to S610 to await another insertion. Flow proceeds to S650 if it is determined to compress the leaf node and its siblings.

At S650, the <key, value> pairs of the identified leaf node and all of its sibling nodes are shifted toward the first <key, value> pair to fill any unused allocated memory between the first stored <key, value> pair and the last stored <key, value> pair of the sibling nodes. S650 may comprise identifying all unused allocated memory locations between a first allocated memory location of a left-most one of the sibling nodes and a last used allocated memory location of a right-most one of the sibling nodes.

Figure 8:
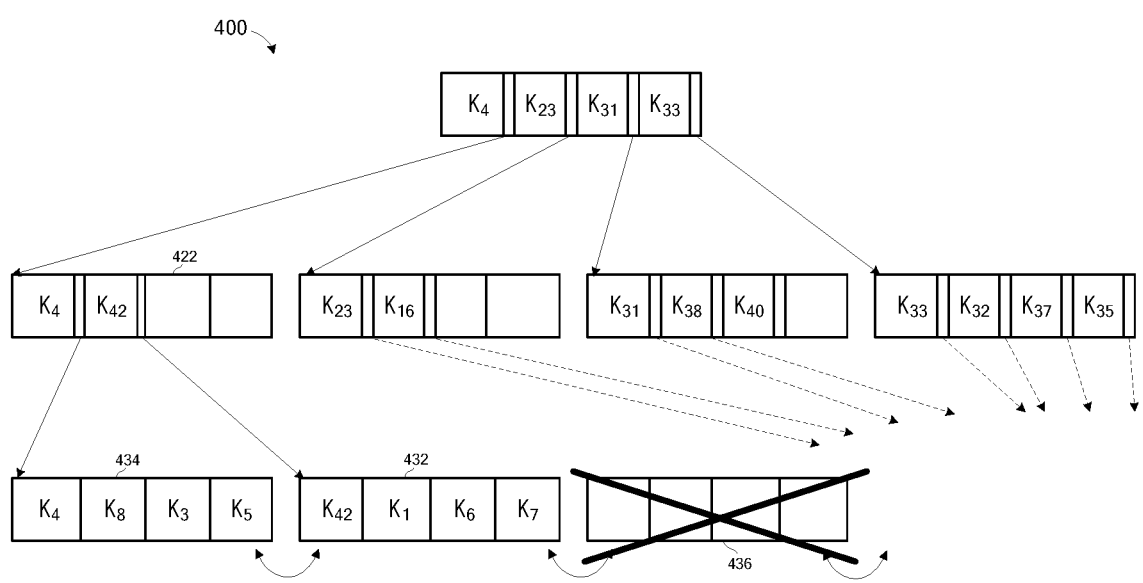
FIG. 8 is a graphical representation illustrating compression of sibling nodes of a tree-based index structure according to some embodiments.

FIG. 8 illustrates S650 according to some embodiments. As shown, keys K3 and K5 (and their paired values) have been shifted from leaf node 432 to leaf node 434, resulting in key K42 being shifted to the first position of node 432. Keys Ki, K6, and K7 (and their paired values) are then shifted from leaf node 436 into the three allocated and now-unused storage locations of leaf node 432. The shifting at S650 is facilitated by following the pointers which exist between sibling nodes of tree-based index structure 400. However, such shifting may be implemented in tree-based index structures which do not include such pointers.

The keys and pointers of the parent internal node of the sibling modes are confirmed at S660. In this regard, the shifting at S650 may require changes to the keys and corresponding pointers of the parent internal node. Continuing the present example, leaf node 436 no longer includes any <key, value> pairs. Accordingly, as shown in FIG. 8, parent node 422 no longer requires a pointer to leaf node 436 or a corresponding key. Additionally, since the first <key, value> pair of node 432 has changed to include K42, the second key of parent node 422 is changed from K3 to K42. The memory location of leaf node 432 is unchanged so the pointer from internal node 422 to leaf node 432 remains unchanged.

It is then determined at S670 whether any of the sibling nodes are now empty (i.e., not containing any <key, value> pairs) as a result of the shift. If not, flow returns to S610 as described above. If so, the memory allocated to the empty sibling node or nodes is de-allocated at S680 as depicted in FIG. 8, thereby freeing up memory space.

Notably, process 600 affects only one internal parent node and its sibling leaf nodes. Accordingly, during execution of process 600, all other portions of the tree-based index structure may be accessed to perform database operations.

Figure 9:
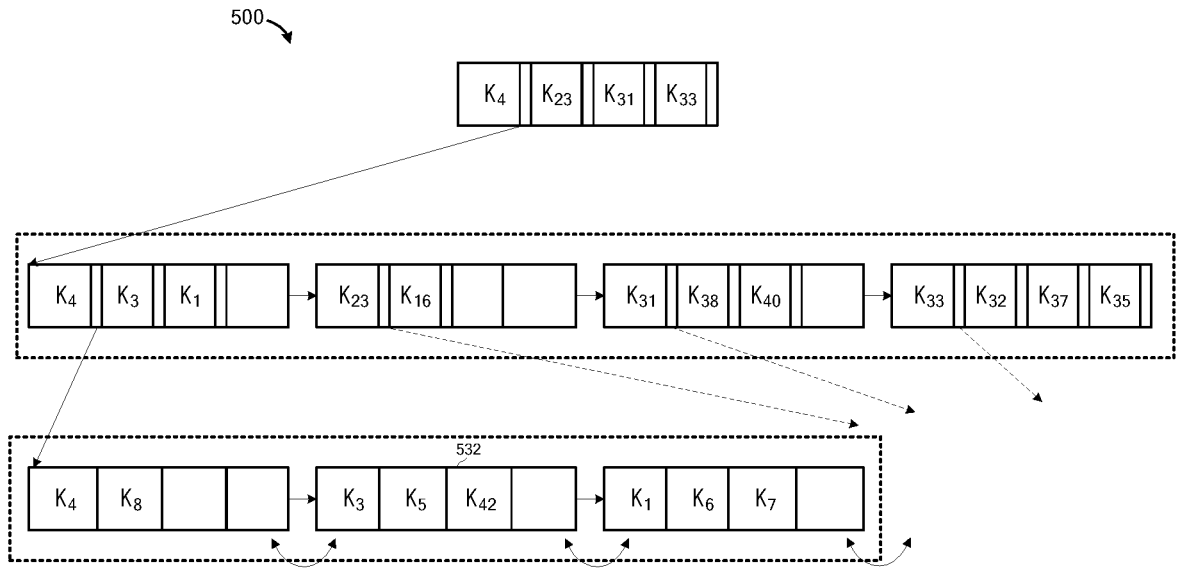
FIG. 9 is a graphical representation illustrating insertion of data into a tree-based index structure according to some embodiments.
Figure 10:
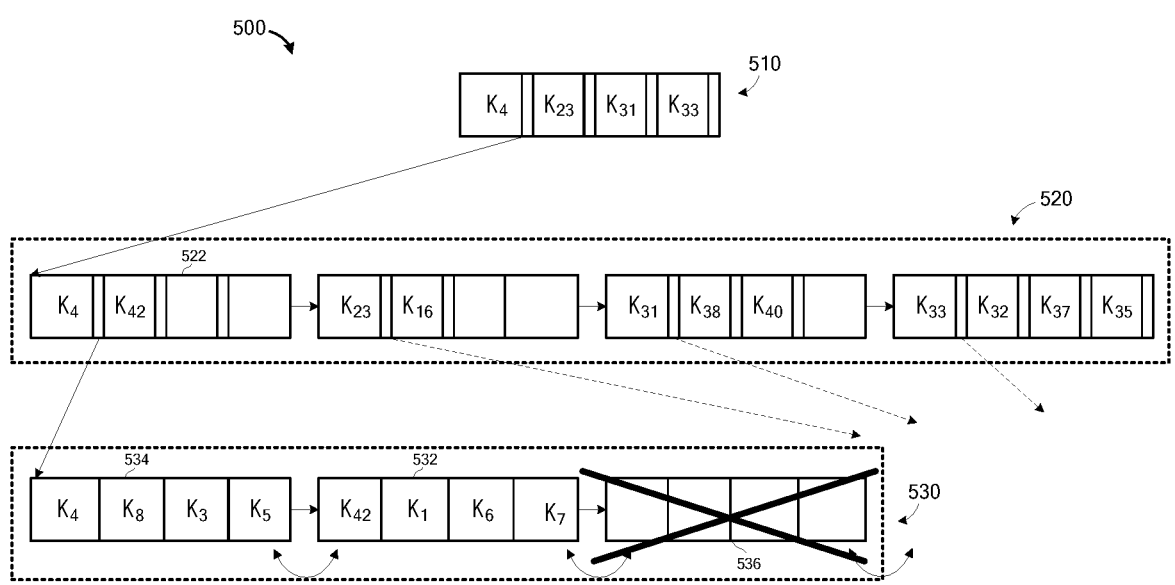
FIG. 10 is a graphical representation illustrating compression of sibling nodes of a tree-based index structure according to some embodiments.

FIGS. 9 and 10 depict an example of S630 through S680 with respect to structure 500 of FIG. 5. As shown in FIG. 9, it is again assumed that key K42 (and its paired value, not shown) has been inserted at leaf node 532 at S630. Next, assuming a determination at S640 to compress the leaf node and its siblings, the <key, value> pairs of the identified leaf node and all of its sibling nodes are shifted at S650. In particular, the pairs are shifted toward the first <key, value> pair of the leaf nodes to fill any unused allocated memory between the first <key, value> pair and the last <key, value> pair of the sibling nodes.

FIG. 10 shows a shift at S650 due to the insertion shown in FIG. 9 according to some embodiments. Keys K3 and K5 (and their paired values) have been shifted from leaf node 532 to leaf node 534, resulting in key K42 being shifted to the first position of node 532. Keys Ki, K6, and K7 (and their paired values) are also shifted from leaf node 536 into the three allocated and now-unused storage locations of leaf node 532. As described above, all sibling nodes of tree-based index structure 500 are stored in contiguous memory areas. This arrangement facilitates the shifting of <key, value> pairs between nodes at S650.

Next, at S660, parent node 522 is modified to delete key Ki because leaf node 536 no longer includes any pairs. Moreover, since key K42 is now the first key of sibling node 532, the second key of node 522 is changed to key K42. The pointer from internal node 522 to leaf node 534 remains unchanged because the memory location of leaf node 432 has not changed. Next, at S680, the memory allocated to leaf node 536 is de-allocated because leaf node 536 is now unused.

Figure 11:
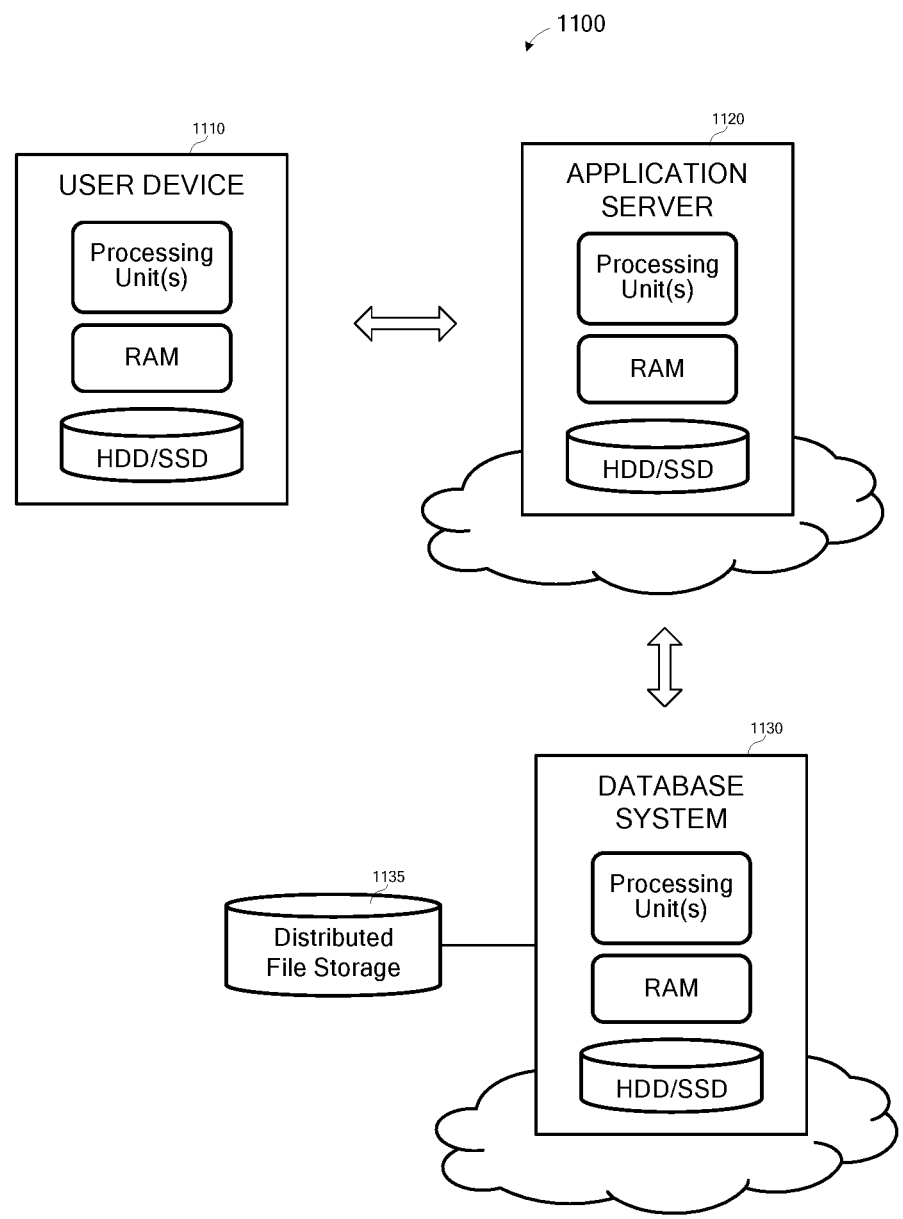
FIG. 11 is a block diagram of a cloud-based database architecture according to some embodiments.

FIG. 11 illustrates cloud-based database deployment 1100 according to some embodiments. The illustrated components may reside in one or more public clouds providing self-service and immediate provisioning, autoscaling, security, compliance and identity management features.

User device 1110 may interact with applications executing on application server 1120, for example via a Web Browser executing on user device 1110, in order to create, read, update and delete data managed by database system 1130 and persisted in distributed file storage 1135. Database system 1130 may store data as described herein and may execute processes as described herein to selectively compression portions of stored tree-based index structures. Application server 1120 and/or database system 1130 may comprise cloud-based compute resources, such as virtual machines, allocated by a public cloud provider. As such, application server 1120 and database system 1130 may be subjected to demand-based resource elasticity.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of system 100 may include a programmable processor to execute program code such that the computing device operates as described herein.

All systems and processes discussed herein may be embodied in program code stored on one or more non-transitory computer-readable media. Such media may include, for example, a DVD-ROM, a Flash drive, magnetic tape, and solid state Random Access Memory (RAM) or Read Only Memory (ROM) storage units. Embodiments are therefore not limited to any specific combination of hardware and software.

Elements described herein as communicating with one another are directly or indirectly capable of communicating over any number of different systems for transferring data, including but not limited to shared memory communication, a local area network, a wide area network, a telephone network, a cellular network, a fiber-optic network, a satellite network, an infrared network, a radio frequency network, and any other type of network that may be used to transmit information between devices. Moreover, communication between systems may proceed over any one or more transmission protocols that are or become known, such as Asynchronous Transfer Mode (ATM), Internet Protocol (IP), Hypertext Transfer Protocol (HTTP) and Wireless Application Protocol (WAP).

Embodiments described herein are solely for the purpose of illustration. Those in the art will recognize other embodiments may be practiced with modifications and alterations to that described above.

What is claimed is:

1. A system comprising:
   at least one processing unit; and
   a non-transitory computer-readable medium storing program code that, when executed by the at least one processing unit, causes the at least one processing unit to perform operations comprising:
      storing data into a target memory location allocated to a target leaf node of a tree-based index structure, the target leaf node being a child node of a parent node of the tree-based index structure, where the tree-based index structure comprises one or more other leaf nodes which are child nodes of the parent node, and each of the target leaf node and the one or more other leaf nodes is associated with a plurality of allocated memory locations;
      identifying all unused allocated memory locations between a first allocated memory location of a left-most one of the target leaf node and the one or more other leaf nodes and a last used allocated memory location of a right-most one of the target leaf node and the one or more other leaf nodes; and
      moving data stored in the target leaf node and the one or more other leaf nodes into the identified unused allocated memory locations, the moving the data comprising moving a first data item from a first position of the target leaf node or the one or more other leaf nodes into a first identified unused allocated memory location and moving a second data item from a second position of the target leaf node or the one or more other leaf nodes into the first position.

2. A system according to claim 1, where in the program code, when executed by the at least one processing unit, causes the at least one processing unit to perform operations comprising:
   updating data stored in the parent node based on the moved data.

3. A system according to claim 1, wherein the program code, when executed by the at least one processing unit, causes the at least one processing unit to perform operations comprising:
   identifying one of the target leaf node and the one or more other leaf nodes which includes no used memory locations; and
   de-allocating the memory locations of the identified leaf node.

4. A system according to claim 3, wherein the program code, when executed by the at least one processing unit, causes the at least one processing unit to perform operations comprising:
   updating data stored in the parent node based on the moved data and the de-allocated memory locations.

5. A system according to claim 1, wherein allocated memory locations associated with the target leaf node and the one or more other leaf nodes are contiguous.

6. A system according to claim 1, wherein the program code, when executed by the at least one processing unit, causes the at least one processing unit to perform operations comprising:

in response to storing the data into the target memory location, determining whether to move the data.

7. A computer-implemented method, comprising:

storing data into a target memory location allocated to a target leaf node of a tree-based index structure, the target leaf node being a child node of a parent node of the tree-based index structure, where the tree-based index structure comprises one or more other leaf nodes which are child nodes of the parent node, and each of the target leaf node and the one or more other leaf nodes is associated with a plurality of allocated memory locations;

identifying all unused allocated memory locations between a first allocated memory location of a left-most one of the target leaf node and the one or more other leaf nodes and a last used allocated memory location of a right-most one of the target leaf node and the one or more other leaf nodes; and moving data stored in the target leaf node and the one or more other leaf nodes into the identified unused allocated memory locations, the moving the data comprising moving a first data item from a first position of the target leaf node or the one or more other leaf nodes into a first identified unused allocated memory location and moving a second data item from a second position of the target leaf node or the one or more other leaf nodes into the first position.

8. A method according to claim 7, further comprising:
updating data stored in the parent node based on the moved data.

9. A method according to claim 7, further comprising:
identifying one of the target leaf node and the one or more other leaf nodes which includes no used memory locations; and
de-allocating the memory locations of the identified leaf node.

10. A method according to claim 9, further comprising:
updating data stored in the parent node based on the moved data and the de-allocated memory locations.

11. A method according to claim 7, wherein allocated memory locations associated with the target leaf node and the one or more other leaf nodes are contiguous.

12. A method according to claim 7, further comprising:
in response to storing the data into the target memory location, determining whether to move the data.

13. A non-transitory computer-readable medium storing program code that, when executed by at least one processing unit, causes the at least one processing unit to perform operations comprising:

storing data into a target memory location allocated to a target leaf node of a tree-based index structure, the target leaf node being a child node of a parent node of the tree-based index structure, where the tree-based index structure comprises one or more other leaf nodes which are child nodes of the parent node, and each of the target leaf node and the one or more other leaf nodes is associated with a plurality of allocated memory locations;

identifying all unused allocated memory locations between a first allocated memory location of a left-most one of the target leaf node and the one or more other leaf nodes and a last used allocated memory location of a right-most one of the target leaf node and the one or more other leaf nodes; and moving data stored in the target leaf node and the one or more other leaf nodes into the identified unused allocated memory locations, the moving the data comprising moving a first data item from a first position of the target leaf node or the one or more other leaf nodes into a first identified unused allocated memory location and moving a second data item from a second position of the target leaf node or the one or more other leaf nodes into the first position.

14. A medium according to claim 13, wherein the program code, when executed by the at least one processing unit, causes the at least one processing unit to perform operations comprising:
updating data stored in the parent node based on the moved data.

15. A medium according to claim 13, wherein the program code, when executed by the at least one processing unit, causes the at least one processing unit to perform operations comprising:
identifying one of the target leaf node and the one or more other leaf nodes which includes no used memory locations; and
de-allocating the memory locations of the identified leaf node.

16. A medium according to claim 15, wherein the program code, when executed by the at least one processing unit, causes the at least one processing unit to perform operations comprising:
updating data stored in the parent node based on the moved data and the de-allocated memory locations.

17. A medium according to claim 13, wherein allocated memory locations associated with the target leaf node and the one or more other leaf nodes are contiguous.

18. A medium according to claim 13, wherein the program code, when executed by the at least one processing unit, causes the at least one processing unit to perform operations comprising:
in response to storing the data into the target memory location, determining whether to move the data.

* * * * *